United States Patent
Katsaros et al.

(10) Patent No.: US 9,915,288 B2
(45) Date of Patent: Mar. 13, 2018

(54) BEARING ASSEMBLY

(71) Applicants: Padelis Katsaros, Schweinfurt (DE); Roland Haas, Schweinfurt (DE); Rene Romeis, Wollbach (DE); Dominique Shah, Bad Koenigshofen (DE); Rainer Spies, Donnersdorf (DE); Volker Wendt, Uechtelshausen/Zell (DE)

(72) Inventors: Padelis Katsaros, Schweinfurt (DE); Roland Haas, Schweinfurt (DE); Rene Romeis, Wollbach (DE); Dominique Shah, Bad Koenigshofen (DE); Rainer Spies, Donnersdorf (DE); Volker Wendt, Uechtelshausen/Zell (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/194,637

(22) Filed: Jun. 28, 2016

(65) Prior Publication Data
US 2017/0002862 A1 Jan. 5, 2017

(30) Foreign Application Priority Data
Jul. 1, 2015 (DE) .......................... 10 2015 212 311

(51) Int. Cl.
*F16C 25/06* (2006.01)
*F16C 19/38* (2006.01)
(Continued)

(52) U.S. Cl.
CPC ............ *F16C 25/06* (2013.01); *F16C 19/364* (2013.01); *F16C 19/385* (2013.01);
(Continued)

(58) Field of Classification Search
CPC .... F16C 19/364; F16C 19/385; F16C 19/548; F16C 19/56; F16C 25/06; F16C 25/063;
(Continued)

(56) References Cited

U.S. PATENT DOCUMENTS

| | | | | |
|---|---|---|---|---|
| 1,586,150 A | * | 5/1926 | Hein | B21B 31/07 384/620 |
| 2,195,795 A | * | 4/1940 | Baker | F16C 19/364 384/564 |

(Continued)

FOREIGN PATENT DOCUMENTS

DE 102006029236 A1 11/2007
DE 102011053022 A1 2/2013
(Continued)

*Primary Examiner* — Marcus Charles
(74) *Attorney, Agent, or Firm* — Bryan Peckjian; SKF USA Inc. Patent Dept.

(57) ABSTRACT

A bearing assembly includes two rolling-element bearings having inner and outer rings and rolling elements between the rings, the rolling-element bearings being configured to be axially preloaded, at least one of the inner and outer rings including an axially adjustable flange ring forming a flange for the rolling elements, the flange ring having a first section axially slidably mounted on one of the bearing rings and a second section axially adjacent to the first section, the second section including a thread, and the thread being configured to threadably engage a counterthread of a separate component at a location axially spaced from the bearing ring.

13 Claims, 3 Drawing Sheets

(51) Int. Cl.
  *F16C 33/60* (2006.01)
  *F16C 33/36* (2006.01)
  *F16C 19/36* (2006.01)
  *F16C 19/54* (2006.01)
  *F16C 19/56* (2006.01)

(52) U.S. Cl.
  CPC ............ *F16C 19/548* (2013.01); *F16C 19/56* (2013.01); *F16C 33/366* (2013.01); *F16C 33/605* (2013.01); *F16C 2226/60* (2013.01); *F16C 2229/00* (2013.01)

(58) Field of Classification Search
  CPC .... F16C 25/083; F16C 33/366; F16C 19/583; F16C 33/605; F16C 2225/60; F16F 33/605
  USPC ........ 384/566–565, 569, 567, 571–572, 585, 384/562, 563, 564
  See application file for complete search history.

(56) References Cited

U.S. PATENT DOCUMENTS

| | | | | |
|---|---|---|---|---|
| 2,439,284 A * | 4/1948 | Buckwalter | ............... | F16C 9/04 384/559 |
| 2,836,473 A * | 5/1958 | Tydeman | .............. | F16C 25/083 384/563 |
| 3,420,589 A * | 1/1969 | Williams | .............. | F16C 19/225 384/620 |
| 3,957,319 A * | 5/1976 | Gorski | .................. | F16C 23/086 384/213 |
| 4,531,847 A * | 7/1985 | F'Geppert | ............ | B23P 11/005 384/519 |
| 4,812,094 A * | 3/1989 | Grube | ..................... | F16B 39/10 301/111.01 |
| 5,009,523 A * | 4/1991 | Folger | ................... | F16C 19/386 384/475 |
| 5,560,687 A * | 10/1996 | Hagelthorn | ........... | B60B 27/001 301/105.1 |
| 5,685,650 A * | 11/1997 | Martinie | ............... | F16C 35/073 384/538 |
| 5,735,612 A * | 4/1998 | Fox | ........................ | F16C 19/364 384/448 |
| 6,464,401 B1 * | 10/2002 | Allard | .................... | F16C 19/364 384/561 |
| 6,616,340 B2 * | 9/2003 | Hacker | .................... | B60B 27/00 384/564 |
| 6,770,007 B2 * | 8/2004 | Fox | ........................ | F16C 19/386 475/348 |
| 7,547,077 B2 * | 6/2009 | Melberg | ..................... | G01K 5/62 116/216 |
| 8,136,997 B2 * | 3/2012 | Rivett | ..................... | F16C 25/06 384/519 |
| 8,262,489 B2 * | 9/2012 | Valovick | ................ | F16D 1/0858 29/525.01 |
| 8,356,944 B2 * | 1/2013 | Fox | ........................ | F16C 19/548 29/898.09 |

FOREIGN PATENT DOCUMENTS

| | | |
|---|---|---|
| DE | 112011103953 T5 | 12/2013 |
| DE | 102012221297 A1 | 5/2014 |

* cited by examiner

BEARING ASSEMBLY

CROSS-REFERENCE

This application claims priority to German patent application no. 10 2015 212 311.1 filed on Jul. 1, 2015, the contents of which are fully incorporated herein by reference.

TECHNOLOGICAL FIELD

The disclosure relates to a bearing assembly comprising two rolling-element bearings, each including an inner ring and an outer ring as well as rolling elements disposed between the bearing rings, wherein the two rolling-element bearings can be preloaded in the axial direction by relative displacement of the inner rings and/or the outer rings, wherein flanges are disposed on the inner rings and/or on the outer rings, which flanges form an axial stop for the rolling elements, and wherein at least one flange is disposed on the bearing ring such that it is adjustable in the axial direction relative to the bearing ring carrying it.

BACKGROUND

A bearing assembly of the above-described type is known from DE 10 2012 221 297 A1. With this previously known solution it is possible to axially preload two cooperating rolling-element bearings, in particular tapered roller bearings, against each other. The setting of the preload is facilitated here in that the flange is disposed on the bearing ring such that it is adjustable in the axial direction relative to the bearing ring that carries it. A thread serves for this purpose, and the thread is incorporated in the bearing ring so that the flange with a corresponding counterthread can be screwed onto the bearing ring and thus axially adjusted.

SUMMARY

It is still not optimal with the previously known solution that only a small amount of installation space is available for adjusting the bearing preload or a corresponding bearing clearance, so that it is relatively difficult to install the required components and perform the adjustment.

An aspect of the disclosure is therefore to further develop a bearing assembly of the above-mentioned type such that it is possible to still be able to perform the preloading in the bearing assembly in a precise manner and wherein it is simultaneously ensured that sufficient space is available for the required components.

A solution to the foregoing problem is characterized in that the flange displaceable relative to the bearing ring—configured as a flange ring—includes a first section that is displaceable on the bearing ring with a sliding seat and that the flange includes a second section, axially adjacent to the first section, that comprises a thread, wherein the thread can be brought into engagement with a counterthread that is incorporated in a separate component, wherein the separate component is disposed axially spaced with respect to the bearing ring.

Here the second component is preferably disposed directly adjacent to the bearing ring, wherein an end surface of the separate component abuts on an end surface of the bearing ring.

Here the separate component is preferably configured as a hollow-cylindrical sleeve (with external or internal thread).

Means are preferably disposed with which the flange ring is axially fixed, or can be axially fixed, on the separate component. According to one preferred embodiment, these means can be formed by a lock nut that is screwed onto the separate component.

According to an alternative solution the means can also be formed by a part of the second section of the flange ring, wherein this part is, or will be, plastically deformed in the region of the counterthread. In this case it is preferably provided that at least one groove extending in the axial direction is incorporated in the separate component. Here the first section of the flange ring is preferably at least sectionally hardened here, while the second section of the flange ring is at least sectionally unhardened (and thus configured for plastic deformation for the purpose of fixing). Here the hardened region of the flange has preferably been hardened with an inductive hardening.

The unhardened region of the flange ring ensures a plastic deformability in a simple manner so that, by a hammer blow, for example, material can be driven into the mentioned groove in the separate component.

A further alternative solution provides that the means are formed by a material-bonded connection, in particular by a soldering, by a welding, or by an adhering. That is, instead of using a lock nut or plastically deforming a portion of the flange ring, a portion of the flange ring can be soldered, welded or adhered to the separate component. The means could also comprise a servo-motor.

With the mentioned means it is possible to first precisely set the preload of the bearing assembly and then fix the relocatable flange in order to permanently maintain the set preload.

The two rolling-element bearings are preferably tapered roller bearings.

The flanges are preferably disposed on the inner rings. Of course it can also be provided in kinematic reversal that the guide-flange ring is disposed on the respective bearing outer rings. Here the counterthread then preferably sits on the flange ring, while a female thread is incorporated in the adjacent separate component.

The thread used is preferably a fine thread.

With respect to the seat surface mentioned it is preferably provided that this is tolerance-adjusted with a clearance fit to a counter-seat-surface on the bearing ring; the clearance fit here is preferably embodied narrow.

One embodiment provides that the adjustable flange is in connection with a drive means, in particular with a motor (servomotor), with which the flange can be rotated relative to the bearing ring. It is thus possible to control or adjust the preload during the operation of the bearing assembly.

The disclosed solution thus provides that the counterthread onto which the flange ring is screwed is not part of the bearing ring itself but is part of an axially adjacent separate component. The relocating of this counterthread to the adjacent separate component has the advantage that sufficient installation space (both in the axial and in the radial direction) is now available to in particular accommodate a lock nut. However, even if another type of axial fixing of the flange ring on the separate component is provided (i.e., either with the above-mentioned plastic deformation or in another manner such as, for example, by adhering, soldering, or welding—in particular laser welding—of the flange ring to the separate component) this can occur with improved installation-space conditions.

Another aspect of the disclosure comprises a bearing assembly that includes a shaft having a shoulder, a first rolling-element bearing comprising a first inner ring and a first outer ring and a first set of rolling elements disposed between the first inner ring and the first outer ring. The first inner ring includes a raceway and a slide surface axially adjacent the raceway, and the first inner ring has a first axial end surface and a second axial end surface. The first inner ring is mounted on the shaft with the first axial end surface abutting the shoulder. The assembly also includes a second rolling-element bearing having a second inner ring and a second outer ring and a second set of rolling elements disposed between the second inner ring and the second outer ring, and a separate component mounted on the shaft and abutting the second axial end surface of the first inner ring. The separate component includes a counterthread. The assembly also includes a flange ring comprising a first section slidably mounted on the slide surface and having a first wall configured to guide the first set of rolling elements and a second section axially adjacent the first section, the second section including a thread radially spaced from the slide surface and in threaded engagement with the counterthread, wherein the first and second rolling-element bearings are configured to be axially preloaded.

The disclosed design of a bearing assembly thus allows a still-simpler setting of the preload of a bearing unit, in particular of a tapered roller bearing unit, via the axial displacement of a guide flange.

The precise setting of the preload leads in an advantageous manner to reduced bearing friction.

BRIEF DESCRIPTION OF THE DRAWINGS

Exemplary embodiments of the disclosure are depicted in the drawings.

DETAILED DESCRIPTION

Figure 1:
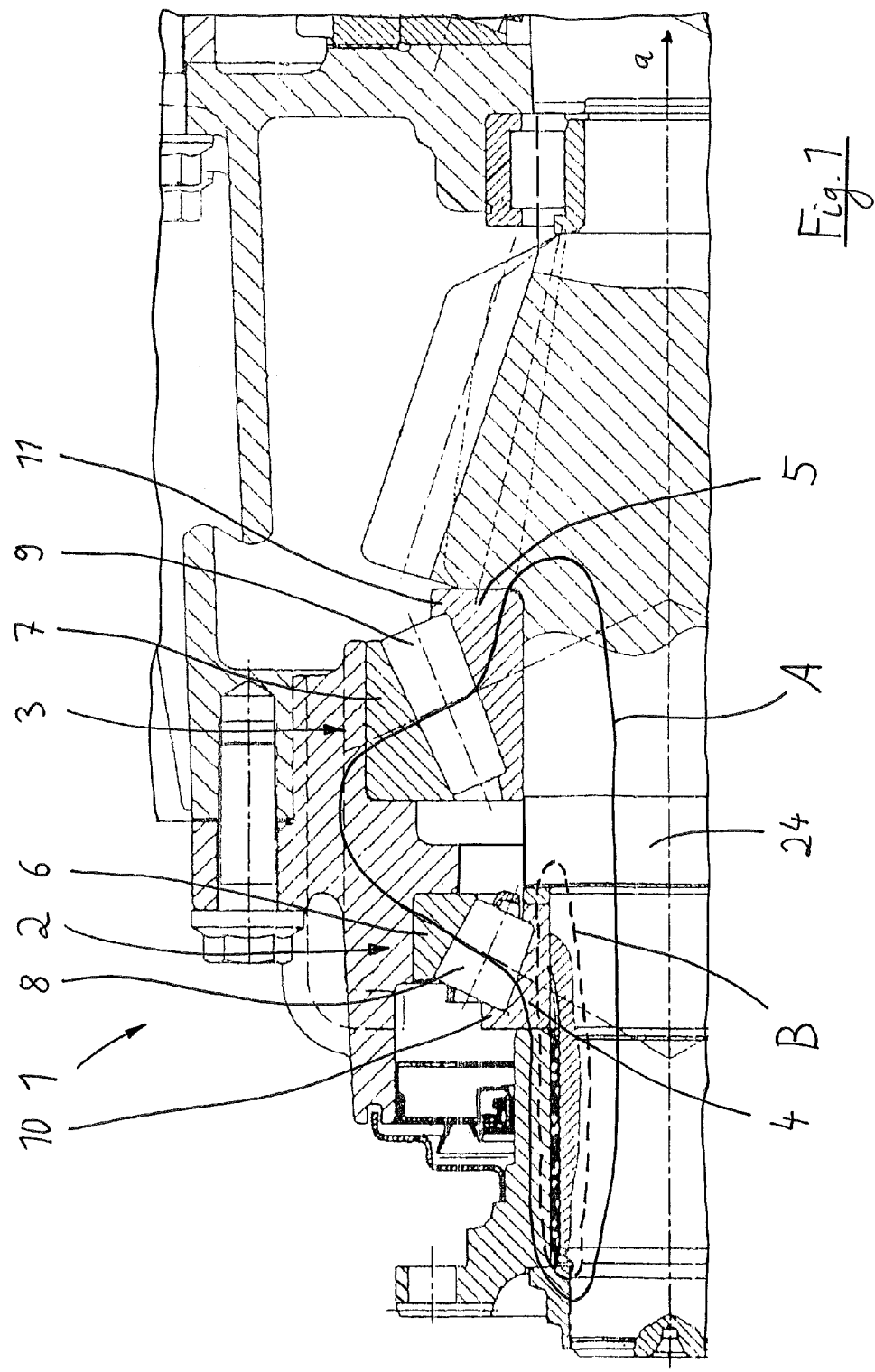
FIG. 1 shows in radial section a bearing assembly comprising inter alia two tapered roller bearings preloaded against each other.

In FIG. 1 a bearing assembly 1 is depicted that includes two tapered roller bearings 2 and 3. The two tapered roller bearings 2, 3 each have an inner ring 4 or 5 and an outer ring 6 or 7. Rolling elements 8 or 9 are disposed between the bearing rings.

The bearing assembly is embodied in a back-to-back arrangement. Flanges 10 and 11 on the inner rings 4, 5 limit the movability of the tapered rollers 8, 9 in the axial direction a.

While one of the flanges 10 or 11 of the inner ring 4, 5 is formed in a conventional manner as a fixed flange on the inner ring 4, 5, this does not apply to the other flange. This flange is embodied as an adjustable flange, i.e., it can be adjusted on the inner ring in the axial direction.

Figure 2:
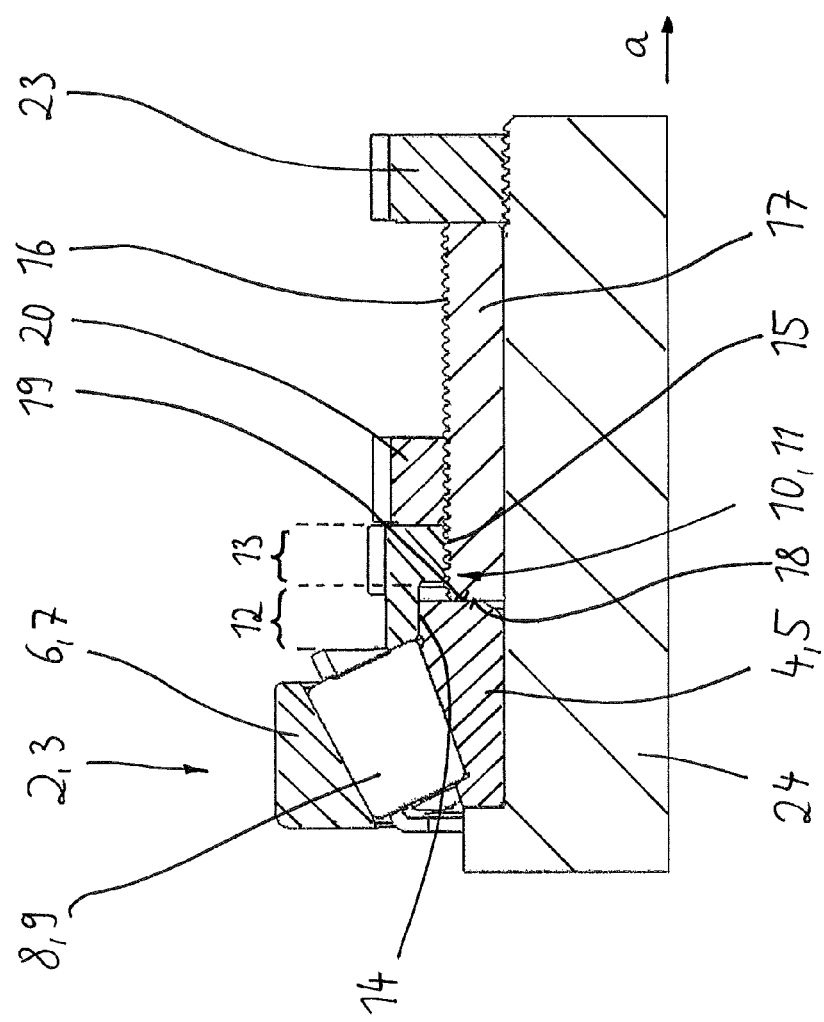
FIG. 2 shows in radial section a shaft section with a tapered roller bearing that is axially preloaded according to a first embodiment of the disclosure.
Figure 3:
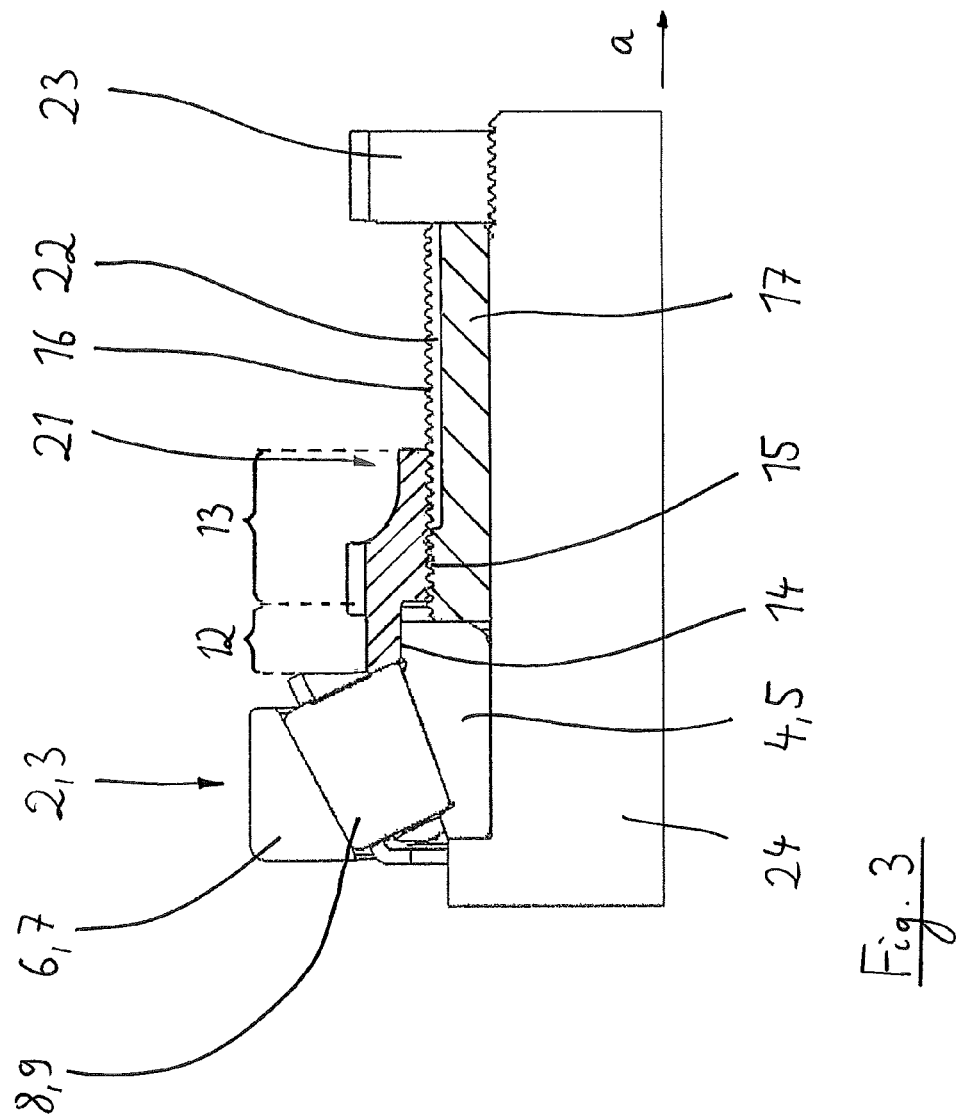
FIG. 3 shows in radial section a shaft section with a tapered roller bearing that is axially preloaded according to a second embodiment of the disclosure.

For this purpose two preferred solutions are depicted in FIGS. 2 and 3.

It is provided here in all cases that the flange 10 or 11 that is displaceable relative to the bearing ring 4 or 5 is configured as a flange ring, which includes a first axial section 12 and a second axial section 13. The first axial section 12 is displaceably disposed with a sliding seat 14 on the bearing ring 4 or 5. The second section 13 of the flange 10 or 11, formed one-piece with the first section 12, includes a thread 15; in the exemplary embodiments according to FIGS. 2 and 3 this is configured as an internal thread. A sleeve-shaped separate component 17 is disposed directly adjacent to the bearing ring 4 or 5. This includes a counterthread 16 that can be brought into engagement with the thread 15 in the flange ring 12, 13, i.e., the flange ring 12, 13 can be screwed onto the separate component 17. As can be seen, the separate component 17 abuts with its end surface 18 on the end surface 19 of the bearing ring 4, 5.

The separate component 17 itself is fixed on the shaft 24 using a clamping nut 23. Accordingly the axial position of the abutment surface of the flange ring 12, 13 for the rolling elements 8, 9 can be adjusted by corresponding screwing-on of the flange ring 12, 13.

In order to permanently set the axial preload or bearing clearance, means 20, 21 are provided for axial fixing the flange ring 12, 13 on the separate component.

In the exemplary embodiment according to FIG. 2 these means are formed by a lock nut 20 that is screwed onto the separate component 17 against the flange ring 12, 13.

However, in the embodiment according to FIG. 3 the flange ring 12, 13 is provided with a not-hardened region at its right side, which in the installed state extends axially into the region of a groove 22 that extends in the axial direction a. If the outer side of the flange ring 12, 13 (see arrow tip of reference number 21 in FIG. 3) is struck with a hammer, the material in this region will be deformed into the groove 22. Rotation of the flange ring 12, 13 relative to the separate component 17 will then no longer possible so that the set preload or bearing clearance will be retained.

Accordingly there is the possibility to axially displace the adjustable flange 10, 11, after installation of the depicted bearing assembly 1, by screwing the adjustable flange 10, 11 so far relative to the inner ring 4, 5 that a desired preload or bearing clearance arises in the bearing assembly. This can only occur at the point in time when the clamping nut 23 is already screwed onto the shaft 24 and tightened, i.e., when the bearing inner rings 4, 5 are fixedly mounted on the shaft 24. Setting the preload can therefore occur independently of mounting and fixing the bearing inner rings 4, 5 on the shaft 24.

By turning the adjustable flange 10, 11 the desired preload is then therefore set, which as stated can advantageously occur independently of the tightening of the clamping nut 23. If the desired end position of the flange 10, 11 on the inner ring 4, 5 is reached it can be fixed by means 20, 21, with which an axial fixing of the flange 10, 11 on the inner ring 4, 5 is possible.

The preload circuits A and B shown in FIG. 1 are separate from each other so that it is possible to first clamp the inner rings 4 and 5, which is effected by tightening the clamping nut 23. This is effected with the high clamping force usual and necessary here. Subsequently the actual bearing preload is set very precisely via the adjustable flange 10, 11, and the thread 15, 16 is secured with the means 20, 21.

The forces that need to be introduced via the adjustable flange 10, 11 in order to achieve a desired roller preload are usually lower by approximately a power of ten than the forces that are needed to preload the inner rings 4, 5. This allows a specific embodiment of the present disclosure: hereafter in particular in large bearing units, depending on the operating state the flange 10, 11 provided with the thread 15 can be axially set, for example, using a servomotor (then of course without fixing with the other means 20, 21 described above) such that the optimal preload always prevails in the bearing unit.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assembly.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2 Rolling-element bearing
3 Rolling-element bearing
4 Inner ring
5 Inner ring
6 Outer ring
7 Outer ring
8 Rolling element
9 Rolling element
10 Flange
11 Flange
12 First section of the flange/of the flange ring
13 Second section of the flange/of the flange ring
12, 13 Flange ring
14 Sliding seat
15 Thread
16 Counterthread
17 Separate component
18 End surface of the separate component
19 End surface of the bearing ring
20, 21 Means for axial fixing
20 Lock nut
22 Groove
23 Clamping nut
24 Shaft
a Axial direction
A Preload circuit
B Preload circuit

What is claimed is:

1. A bearing assembly comprising two rolling-element bearings, each rolling-element bearing having an inner ring and an outer ring and rolling elements disposed between the inner ring and the outer ring, wherein the inner ring and the outer ring are configured to be axially preloaded, wherein a flange is disposed on each of the inner rings and/or on each of the outer rings, each of the flanges forming an axial stop for the rolling elements, wherein at least one of the flanges is axially adjustable relative to the inner ring or relative to the outer ring on which the at least one of the flanges is disposed, wherein the at least one of the flanges comprises a flange ring having a first section axially slidably mounted on one of the bearing rings and a second section axially adjacent to the first axial section, the second section comprising a thread, wherein the thread is configured to threadably engage a counterthread of a separate component at a location axially spaced from the bearing ring, a lock nut adjacent to second section of the flange ring and engaged with the counterthread of the separate component such that the lock nut permanently sets the axial preload by positionally fixing the flange ring.

2. The bearing assembly according to claim 1, wherein an end surface of the separate component directly abuts an end surface of the bearing ring.

3. The bearing assembly according to claim 1, wherein the separate component is a hollow-cylindrical sleeve.

4. The bearing assembly according to claim 1, wherein the separate component includes at least one axial groove.

5. The bearing assembly according to claim 1, wherein the rolling elements comprise tapered rolling elements.

6. The bearing assembly according to claim 1, wherein the at least one of the flanges is disposed on one of the inner rings.

7. The bearing assembly according to claim 1,
wherein an end surface of the separate component directly abuts an end surface of the bearing ring,
wherein the separate component is a hollow-cylindrical sleeve,
including means for axially fixing the flange ring on the separate component,
wherein the rolling elements comprise tapered rolling elements, and
wherein the at least one of the flanges is disposed on one of the inner rings.

8. The bearing assembly according to claim 1, wherein the counterthread is radially offset from the first section of the flange ring.

9. The bearing assembly according to claim 1, wherein the thread is radially offset from the first section of the flange ring.

10. The bearing assembly according to claim 1,
including a shaft having a shoulder,
wherein one of the inner rings comprises a raceway and a slide surface axially adjacent the raceway, the one of the inner rings having a first axial end surface and a second axial end surface, the one of the inner rings being mounted on the shaft with the first axial end surface abutting the shoulder,
wherein the separate component is mounted on the shaft and abuts the second axial end surface of the first inner ring, and
wherein the first section of the flange ring is slidably mounted on the slide surface and the thread is radially spaced from the slide surface.

11. A bearing assembly comprising two rolling-element bearings, each rolling-element bearing having an inner ring and an outer ring and rolling elements disposed between the inner ring and the outer ring, wherein the inner ring and the outer ring are configured to be axially preloaded, wherein a flange is disposed on each of the inner rings and/or on each of the outer rings, each of the flanges forming an axial stop for the rolling elements, wherein at least one of the flanges is axially adjustable relative to the inner ring or relative to the outer ring on which the at least one of the flanges is disposed, wherein the at least one of the flanges comprises a flange ring having a first section axially slidably mounted on one of the bearing rings and a second section axially adjacent to the first axial section, the second section comprising a thread, wherein the thread is configured to threadably engage a counterthread of a separate component at a location axially spaced from the bearing ring, a plastically deformed part of the second section of the flange ring axially fixing the flange ring on the separate component, wherein the first section of the flange ring is at least sectionally hardened and the second section of the flange ring is at least sectionally unhardened.

12. A bearing assembly comprising:
a shaft having a shoulder,
a first rolling-element bearing comprising a first inner ring and a first outer ring and a first set of rolling elements disposed between the first inner ring and the first outer ring, the first inner ring including a raceway and a slide surface axially adjacent the raceway, and the first inner ring having a first axial end surface and a second axial end surface, the first inner ring being mounted on the shaft with the first axial end surface abutting the shoulder,
a second rolling-element bearing having a second inner ring and a second outer ring and a second set of rolling elements disposed between the second inner ring and the second outer ring,
a separate component mounted on the shaft and abutting the second axial end surface of the first inner ring the separate component including a counterthread, and
a flange ring comprising a first section slidably mounted on the slide surface and having a first wall configured to guide the first set of rolling elements and a second section axially adjacent the first section, the second section including a thread radially spaced from the slide surface and in threaded engagement with the counterthread,
a lock nut adjacent to second section of the flange ring and engaged with the counterthread of the separate component such that the lock nut permanently sets the axial preload by positionally fixing the flange ring,
wherein the first and second rolling-element bearings are configured to be axially preloaded.

13. The bearing assembly according to claim 12, including means for axially fixing the flange ring on the separate component.

* * * * *